US006474180B2

(12) United States Patent
Bigus

(10) Patent No.: US 6,474,180 B2
(45) Date of Patent: Nov. 5, 2002

(54) PIPETTE DEVICE

(75) Inventor: Hans-Jürgen Bigus, Pliezhausen (DE)

(73) Assignee: Hirschmann Laborgeräte, Eberstadt (DE)

( * ) Notice: Subject to any disclaimer, the term of this patent is extended or adjusted under 35 U.S.C. 154(b) by 24 days.

(21) Appl. No.: 09/811,591

(22) Filed: Mar. 20, 2001

(65) Prior Publication Data

US 2002/0134176 A1 Sep. 26, 2002

(51) Int. Cl.[7] .................................................. G01N 1/00
(52) U.S. Cl. .................................................... 73/864.11
(58) Field of Search ......................... 73/863.32, 864.11, 73/864.15, 864.21, 864.86, 864.87, 864.01, 864.73, 864.74; 422/100; 436/180

(56) References Cited

U.S. PATENT DOCUMENTS 3,691,844 A * 9/1972 Moore ..................... 73/864.15
6,082,204 A * 7/2000 Munderloh .............. 73/864.21

FOREIGN PATENT DOCUMENTS

EP 0 725 267 8/1996

OTHER PUBLICATIONS

Kluge, Stefan et al.: Mikroelektronik liefert Grundlagen für Mikropumpen. In: TR Transfer, Nr. 15, 1996, Pa.50–54.
Zengler, R. et al.: A bidirectional silicon micrompump. In: Sensors and Actuators A 50, 1995, Pa. 81–86.

* cited by examiner

*Primary Examiner*—Robert Raevis

(57) ABSTRACT

In a pipette device comprising at least one pipette channel and at least one pump means, which cooperates with the pipette channel for suction and dispensed delivery of liquid, the pump means consists of two electrically driven micro-pumps each having one suction-side and one pressure-side connection, one of which is connected to the pipette channel via its suction side and the other via its pressure side. The pipette device thereby acts as an air cushion pipette and is preferably provided with current via solar cells.

14 Claims, 1 Drawing Sheet

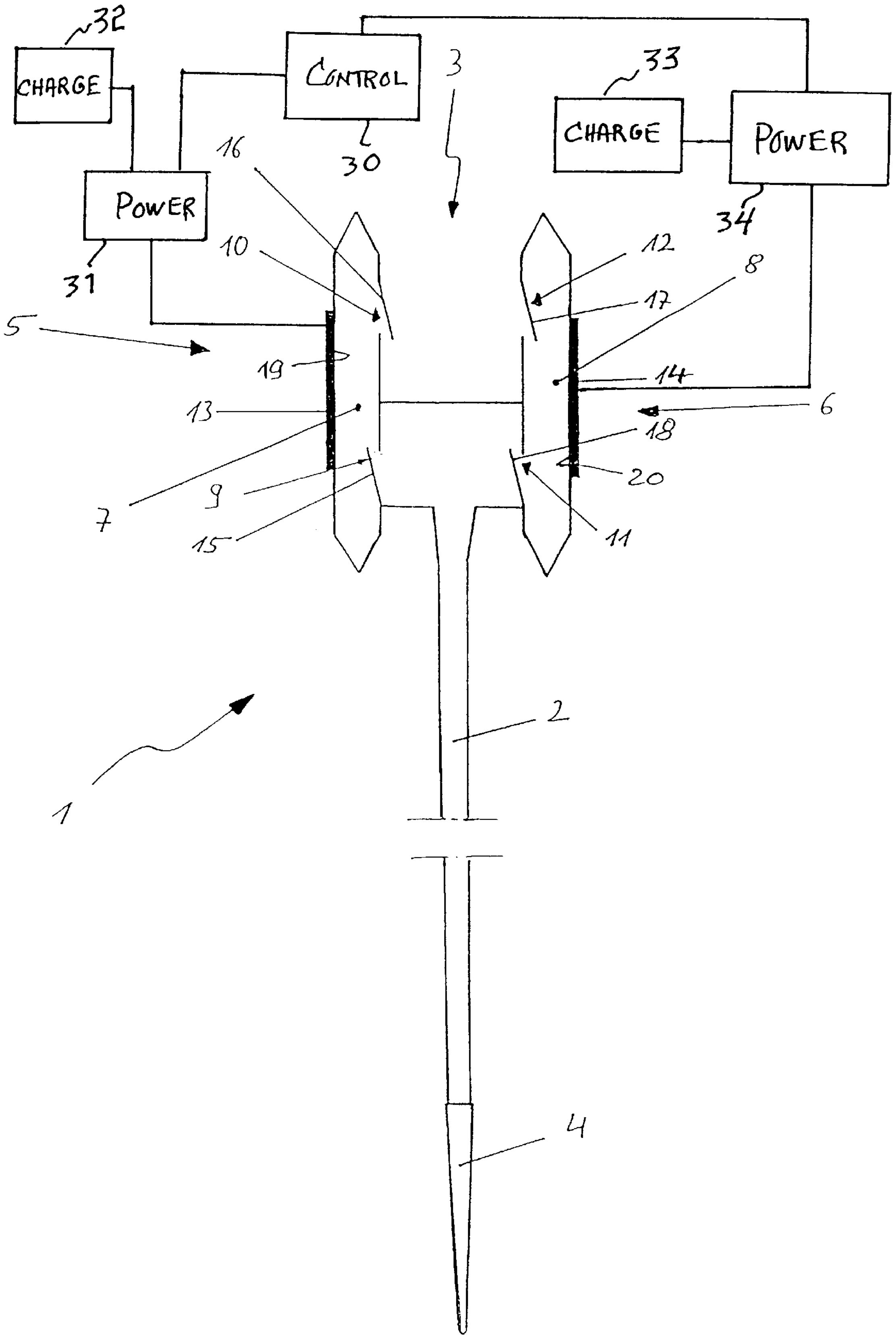
32
CHARGE
CONTROL
3
33
CHARGE
POWER
30
16
POWER
34
10
12
31
8
17
5
19
14
13
6
18
20
9
7
15
11
2
1
4

PIPETTE DEVICE

This invention is related to DE 198 47 869.0 filed Oct. 17, 1998 the complete disclosure of which is hereby incorporated by reference.

BACKGROUND OF THE INVENTION

The present invention concerns a pipette device comprising at least one pipette channel and at least one pump means which cooperates with the pipette channel for suction and dispensed delivery of liquid.

Pipette devices of this type are widely used in laboratory technology. Many tests, analysis, synthesis etc. require exact dispensing and/or removal of liquid in small to smallest amounts. It is thereby mainly important that the dispensed volume can be preset and reproduced and that the device is suitable for series tests.

Pipette devices of this type are used in particular as multiple channel pipettes to simultaneously supply a plurality of samples disposed on titration plates. All pipettes are thereby actuated by a common drive element via one piston and one air cushion each and the pipette channels comprise exchangeable pipette tips which receive the volume to be dispensed and which can be replaced to curtail contamination. Contamination of the pipette channels themselves is prevented by the air cushions. The known devices have, in particular, the disadvantage that the pipette volume cannot be arbitrarily minimized due to the stroke length of the piston, not even with smallest piston diameters. This problem exists with both directly actuated as well as air cushion pipettes.

It is the underlying purpose of the present invention to propose a pipette device for pipette dispensing of arbitrary small volumes with simultaneous small space requirements for the pump means.

SUMMARY OF THE INVENTION

This object is achieved in accordance with the invention in a pipette device of the above mentioned type in that the pump means consists of two electrically actuated micropumps each having one suction-side and one pressure-side connection, and that one micropump is connected to the pipette channel at its suction side and the other is connected to the pipette channel at its pressure side.

The recently developed micropumps permit the supply and precise setting of very small volumes. The arrangement of two micropumps, one of which is connected to the pipette channel on its suction side and the other on its pressure side, permits exact setting of the supply volume during suction and also during dispensing. Each pump thereby transports the medium in only one, but mutually opposite, direction and their connections may be of corresponding simple construction. Since they require little space they can be easily accommodated without having an overall construction volume in excess of conventional pipettes.

The micropump may be driven piezoelectrically, electromagnetically or electrostatically. The electrostatic drive utilizes the repelling forces of differing charges.

In an advantageous embodiment, an air cushion is disposed between the liquid in the pipette channel and the pump means to prevent contact between the medium to be supplied and the micropumps. The micropumps are not contaminated and, when using pipette tips, the pipette channels do not contact the medium to be supplied.

Since one micropump is connected to the surroundings via its pressure connection and the other micropump via its suction connection, in connection with the air cushion, only air is transported in the micropumps, with the two micropumps being connected to the surroundings with their respective connections for suctioning and delivering air.

Advantageously, the suction and pressure-side connections of the micropumps also comprise check valves to ensure a respective opposite flow direction in both micropumps.

In a preferred embodiment, the two micropumps can be activated independently of one another such that the volume of the medium suctioned by the one micropump need not be identical to the volume delivered in a dispensed fashion by the other micropump. Consequently, several pipette processes can be carried out, one after the other, with one single suction stroke.

In a further advantageous embodiment, only one of the connections to the pipette channel is open at a time, whereas the second remains closed. This prevents air from flowing into the passive pump or being suctioned from its pump chamber, which would impair dispensed supply.

Moreover, each of the two micropumps advantageously has a constant stroke such that each micropump has a defined pumping volume and the transported or delivered volume is defined by the number of strokes.

Dispensing devices having several pipette channels, e.g. for use in connection with titration plates, preferably have one pump means associated with each pipette channel. This permits independent definition of the delivery volume at each individual pipette channel thereby facilitating e.g. series tests with different titration volumes in one working step.

The micropumps are advantageously fashioned as diaphragm pumps to require a minimum of space and simultaneously offer the highest operational reliability. The diaphragm can be made from rubber-elastic materials, e.g. polymers, but also from metallic or ceramic materials.

In a preferred embodiment, the dispensing device comprises an electronic control device for actuating the electric drive of each micropump which can both control the two micropumps associated with one pipette channel, as well as actuate the micropumps of different pipette channels independently of one another.

To always guarantee safe and reliable operation of the pipette device, the current supply of the pump means is advantageously augmented by at least one solar cell. The pipette device may further be equipped with a current storing unit, such as storage battery, capacitor or the like to provide continuous current supply for the micropump even when there is no or only insufficient incident light, e.g. during pipette use when the solar cell is covered by a hand.

The solar cell may be disposed e.g. directly on a housing of the pipette device at a location which is constantly exposed to light. If the pipette device has a current storage unit, it may alternatively have an associated solar-operated charging station for charging the current storage unit. Such a charging station is advantageously configured as a holder which receives the pipette device when it is not used. In particular, a charging station may also be provided for simultaneous charging and storing of several pipette devices, e.g. having different dispensing volumes.

The invention is described below by means of an embodiment.

BRIEF DESCRIPTION OF THE DRAWING

The sole FIGURE schematically indicates the pipette device in accordance with the invention.

DESCRIPTION OF THE PREFERRED EMBODIMENT

The drawing schematically shows a pipette device 1 consisting of a pipette channel 2 and a pump means 3. A pipette tip 4 is releasably plugged onto the lower end of the pipette channel 2.

Air is present in the pipette channel 2 and in the pump means 3. The medium to be suctioned and dispensed only contacts the pipette tip 4.

When replacing the pipette tip 4, the pipette device 1 can be immediately reused for other media, without further cleaning.

The pump means 3 consists of a first micropump 5 and a second micropump 6. Each micropump 5 and 6 has one pump chamber 7, 8, one suction-side connection 9, 12, and one pressure-side connection 10, 11. The connections 9, 10, 11, 12 are back-flow secured using simple check valve flaps 15, 16, 17, 18. The micropumps 5 and 6 are connected to the pipette channel 2 via one connection 9, 11 and to the surroundings via their respective second connection 10, 12. The micropump 5 is thereby connected, on its suction side, to the pipette channel 2 and is connected, on its pressure side, to the surroundings, while the other micropump 6 is connected, on its pressure side, to the pipette channel 2 and, on its suction side, to the surroundings.

In the embodiment shown, the micropumps 5, 6, are diaphragm pumps, each having one diaphragm 19, 20 made from a rigid material. Each diaphragm 19, 20 is directly connected to one piezo-actuator 13, 14.

When suctioning the medium to be dispensed into the pipette tip 4, a piezoelectric actuator 13 of the micropump 5 is controlled via a control electronics 30 such that the volume of the pump chamber 7 increases and air from the pipette channel 2 is suctioned into the pump chamber 7 of the micropump 5 with the connection 9 being open and the connection 10 being closed, wherein the medium to be supplied enters the pipette tip 4 due to the under-pressure generated in the pipette channel 2. At the same time, a piezoelectric actuator 14 of the micropump 6 is actuated such that the volume of the pump chamber 8 increases, the pressure-side connection 11 remains closed and surrounding air flows into the pump chamber 8 through the suction-side connection 12. The stroke of the actuator 13 can be electronically controlled 30 such that a freely adjustable volume is suctioned. Through adjustment of the number of strokes, the overall volume of a dispensing process can be varied.

When the supply medium is delivered, the two actuators 13 and 14 are actuated such that the volumes in the pump chambers 7 and 8 are reduced, wherein air is discharged from the pump chamber 7 of the micropump 5 via the pressure-side connection 10, with the suction-side connection 9 being closed. The air from the pump chamber 8 of the micropump 6 is pressed into the pipette channel 2 via the pressure-side connection 11 of the micropump 6. The medium located in the pipette tip 4 is thereby dispensed in correspondence with the stroke volume of the micropump 6, and optionally several times in correspondence with the set number of strokes.

To prevent undesired overflow of the pump volume from one micropump to the other, the volume of the hollow space between the two micropumps must be correspondingly selected. Optionally, the drive of the inactive pump can be reversed during the working cycle of the other pump to guarantee closure of the valve flaps.

Control means 30 communicate with a power unit 31, 34 for driving the pumps 5, 6. The power unit 31, 34 can be a solar cell, a current storage unit, a storage battery and/or a capacitor. The power unit 31, 34 can also be charged with a solar operated charging station 32, 33.

I claim:

1. A pipette device for suctioning and dispensing liquid, the device comprising:

at least one means defining a pipette channel;

a first electrically operated micropump, said first micropump having a first suction-side connection and a first pressure-side connection; and a second electrically operated micropump, said second micropump having a second suction-side connection and a second pressure-side connection, wherein said first suction-side connection and said second pressure-side connection each communicate with said pipette channel, wherein an air cushion is disposed between liquid in said pipette channel and said first suction-side connection, said air cushion also being disposed between liquid in said pipette channel and said second pressure-side connection, with said first pressure-side connection and said second suction-side connection each being connected to a surroundings of the pipette device.

2. The pipette device of claim 1, wherein each of said first suction-side connection, said first pressure-side connection, said second suction-side connection, and said second pressure-side connection comprises a check valve.

3. The pipette device of claim 1, further comprising means for independent actuation of said first and said second micropump.

4. The pipette device of claim 1, wherein one of said first suction-side connection and said second pressure-side connection is open when an other of said first suction-side connection and said second pressure-side connection is closed.

5. The pipette of claim 1, wherein said first and said second micropump are controlled to transport different volumes.

6. The pipette device of claim 1, wherein each of said at least one means defining a pipette channel has an associated first and second micropump.

7. The pipette device of claim 1, wherein said first and said second micropumps are diaphragm pumps.

8. The pipette device of claim 7, wherein each diaphragm pump comprises one piezo-actuator.

9. The pipette device of claim 1, further comprising electronic control means communicating with each of said first and said second micropumps.

10. The pipette device of claim 1, further comprising at least one solar cell for supplying current to at least one of said first and said second micropumps.

11. The pipette device of claim 10, further comprising a current storage unit communicating with at least one of said first and said second micropumps.

12. The pipette device of claim 11, wherein said current storage unit comprises a storage battery.

13. The pipette device of claim 11, wherein said current storage unit comprises a capacitor.

14. The pipette device of claim 11, further comprising a solar-operated charging station for charging said current storage unit.

* * * * *